United States Patent

[11] 3,612,818

| [72] | Inventors | Richard Bechtle<br>Niederhochstadt Tanunus;<br>Erich Bragard, Kelkheim Taunus; Gunther<br>Hannappel, Frankfurt am Main, all of<br>Germany |
|---|---|---|
| [21] | Appl. No. | 45,323 |
| [22] | Filed | June 11, 1970 |
| [45] | Patented | Oct. 12, 1971 |
| [73] | Assignee | Messer Griesheim GmbH<br>Frankfurt am Main, Germany |
| [32] | Priority | June 13, 1969 |
| [33] | | Germany |
| [31] | | P 19 30 154.3 |

[54] WELDING CONTROL ARRANGEMENT
10 Claims, 5 Drawing Figs.

[52] U.S. Cl. .................................................. 219/130,
219/131 F
[51] Int. Cl. ..................................................... B23k 9/12

[50] Field of Search .......................................... 219/124,
125, 131 F, 125 PL; 338/8, 9

[56] References Cited
UNITED STATES PATENTS

| 2,529,111 | 11/1950 | Steinberger .................. | 219/131 F |
| 2,670,423 | 2/1954 | Darner et al. ................. | 228/8 |
| 3,264,447 | 8/1966 | Agnew ......................... | 219/131 F |

Primary Examiner—J. V. Truhe
Assistant Examiner—J. G. Smith
Attorney—Connolly & Hutz ABSTRACT: An apparatus for controlling the application of weld metal in electric calarc welding includes a mechanical scanning device upstream from the welding torch. The scanning device penetrates into the welding groove and measures at least one physical dimension thereof which is converted into signals for controlling the welding material feed.

WELDING CONTROL ARRANGEMENT

BACKGROUND OF INVENTION

The joining of plates with edge preparation and a given, uniform weld reinforcement creates difficulties in using mechanical methods. For the butt welding of thick plates, for example, a careful preparation of the welding edges is necessary to obtain a future strength of the weld which would have a magnitude corresponding to the other parts of the material welded. Difficulties arise from the fact that a very long Difficulties does not have absolutely uniformly prepared seams. This results in a groove of variable width in the welding direction of the plate.

A certain, possibly conform reinforcement of the welded material is especially important in ship building. For a 25–35 mm. thick ship panel, for example, a so-called double-V- (butt) joint preparation is necessary, which is made usually by the autogeneous or plasma jet cutting method. The requirement in welding panels is that the thickness of the welding bead (or weld reinforcement) must be at a definite ratio to the thickness of the plate. A uniform strength of all welded joints can be obtained only in this case. Thus, a sufficient degree of filling on the one hand and an optimum weld reinforcement, on the other, are a requirement.

The above-mentioned difficulties are also increased by the fact that the work pieces to be welded, prepared for a double-V-groove joint, must be welded on both sides, i.e. in a horizontal position of the plate, from above, and from below. It is also possible to turn the welded material after the upper half of the double-V-groove joint has been finished, and to weld subsequently the other half of the double-V-joint again in a normal position. Such a turning is however very difficult for large, bulky and heavy workpieces, which are usually welded. Regardless of the large room requirement, expensive special lifting devices are necessary. Thus it is preferably to avoid the turning of the workpiece and to apply the welding overhead for the second half of the joint. Proper overhead welding is on the other hand not easy by the automatized arc-welding process. On the other hand, no welder is willing to weld a multilayer welded joint overhead by hand. A compromise thus offers and asymmetrical double-V-groove weld preparation in such a manner that the welding joint lying under the plate, to be filled by the difficult overhead welding method, is formed relatively small with respect to that lying above the plate so that it can be filled with a few layers. Starting from the fact that the inaccuracies in edge preparation are distributed percentagewise uniformly on the upper and the smaller lower part of the welding joint, the same percent inaccuracy affects the smaller weld cross section of the lower joint part to a much greater extent than the larger upper weld cross section. The disadvantageous result is the great variation in the thickness of the welded joints especially for the overhead-welded lower seam.

Attempts have been made, of course to improve and determine the methods used for edge preparation, such as the autogeneous and plasma cutting methods. These efforts are, however, limited by the material. For example despite the best cutting tools, an inaccurate welding edge preparation can be caused by an unevenness of the plate and can be avoided to a certain extent only by an exact regulation of the height of the cutting torch in the cutting process. Thus it is clear that such inaccuracies can cause variation in the welded joint cross section over the length of the welded seam.

Regardless of the varying groove width due to an inaccurate edge preparation, in carrying out welding processes by the fully automatic MIG (metal-inert gas) process, additional difficulties arise caused by the welding device itself. It cannot be expected that the amount of material fed through the arc per unit time is constant (wire feed device) nor can a stable mains voltage and hence an invariable electric melting power be assumed in principle.

However, in order to obtain a proper welding of the workpieces, it is necessary to adapt the welding material feed to the desired weld cross section. This has so far been possible only by hand, not by automatic welding methods.

SUMMARY OF INVENTION

An object of this invention is to avoid the above-described disadvantages i.e. to permit adapting the welding material application to the varying welded seam cross section. In order to solve this problem, a mechanical scanner is provided upstream from the torch and penetrating into the welding groove, to measure its depth and/or width. A converting device is attached to the scanner for converting the measured values into signals and for controlling the weld metal feed.

For example, in widening the welding groove cross section, by varying the edge distance or by increasing the angle of inclination of the edges, the scanner penetrates more deeply into the welding groove. This penetrating movement of the scanner is used as a signal for increasing the welding wire feed and/or for decreasing the feed of the welding torch and/or for varying the welding current and/or the welding voltage, whereby the weld metal feed is increased in both cases. In the converse situation, the weld metal feed can be decreased in the same manner.

In addition to the application of the scanner, according to this invention, in through filling welding, the device of this invention proved good especially for scanning the sides of a welding groove in the overhead position. In a welded seam arranged in the overhead position, inaccuracies in the edge preparation affect the weld cross section. An increase in the weld cross section to 100 percent and a decrease of it to 50 percent are not rare. Such great differences occur especially in an unsymmetrical double-V-seam preparation. The disadvantageous result is a too thick weld reinforcement or an insufficient weld reinforcement, alternately. By using the apparatus according to this invention, the weld metal feed is so controlled that a weld with an almost equally large weld reinforcement is obtained.

Although there have been scanning devices known in which rolls or glide shoes are used as scanning contactors, the distance between the torch and the workpiece is controlled by this during welding or flame cutting, but the weld metal feed is not controlled.

This invention is also characterized in that the mechanical scanner consists of a lever pivoted around a fixed point, one end of which carries a scanning stylus and the other end of which is connected with a final control element.

The final control element adjusted in dependence on the depth of penetration of the scanner is used directly, for example, by varying this element, for controlling the weld metal feed and/or the welding current and/or the welding voltage and/or the traveling speed.

However, it is also possible to use the change of the control element indirectly as a regulating current, when the control is supplied for example with an electrical bridge circuit and the control is produced by the differential voltage of the bridge.

In a further development of the apparatus according to this invention, it was proposed also to use a final control assembly consisting of an adjustable resistance, condenser, induction coil, and the like which have a nonlinear characteristic preferably over the adjusting path. With the nonlinear characteristic of the final control assembly over the adjusting path it is possible to control precisely the height of filling, the nonlinear function of the wire feed and/or the track velocity and/or the welding current and/or the welding voltage.

According to the construction of the scanning contactor, it is proposed in this invention to use rolls as scanning contactor.

According to another model of scanning contactor, it is proposed in this application to use capacitive and/or inductive feelers as scanning contactors. These feelers then serve to adjust the frequency of a high frequency transmitting circuit, where the frequency serves as a control signal. It has been shown that especially by using a capacitive feeler, which is used in the known manner for controlling a preferably high frequency transmitting circuit, the necessary signal can be obtained.

Another embodiment of this invention in which the opening width of the welding groove is used for adjusting purposes is characterized in that the scanner has two rolls, which run always on opposite edges of the welding groove and whose distance changes at least in accordance with the variation of the welding groove cross section; this distance variation is then a measured value for the signal controlling the variation in the weld metal feed. It is advantageous for this purpose to keep the rolls at a constant level, for example, related to the workpiece surface. This can be obtained simply and advantageously so that the rolls are arranged on a carriage moving along the welding groove.

According to another embodiment of this invention, it is proposed that the two rolls of the scanning unit, which run always on opposite edges of the welding groove, are arranged each on one axis and both axes are pivoted around a common center of rotation; the change in the angle of the axes provides a measured value for the signal controlling the change in the weld metal feed.

Such a construction has the advantage that of a convexity of one edge of the welding groove and at a concavity of the other edge, corresponding to the convexity, no signal is given for changing the weld metal feed. A change in the weld metal application is not necessary in the above-described case because there is only a lateral shift in the welding groove and the filling volume remains unchanged. However, if the reinforcement and/or the reduction on the opposite places of the edges of the welding groove are different, the weld metal feed is affected correspondingly, i.e. the angle between the two axes changes. The change in angle is thus a measured value for the signal to change the weld metal feed.

The accuracy can be increased in the control of the welding material application according to this invention by attaching a device to the welding torch for measuring the weld reinforcement and for changing the measured values into signals; these signals are then used for correcting the weld metal feed and/or the welding current and/or the welding voltage and/or the welding speed.

This invention is explained now more closely by means of the examples given in the drawing as well as by the following description. The figures show:

THE DRAWINGS

DETAILED DESCRIPTION

Figure 1:
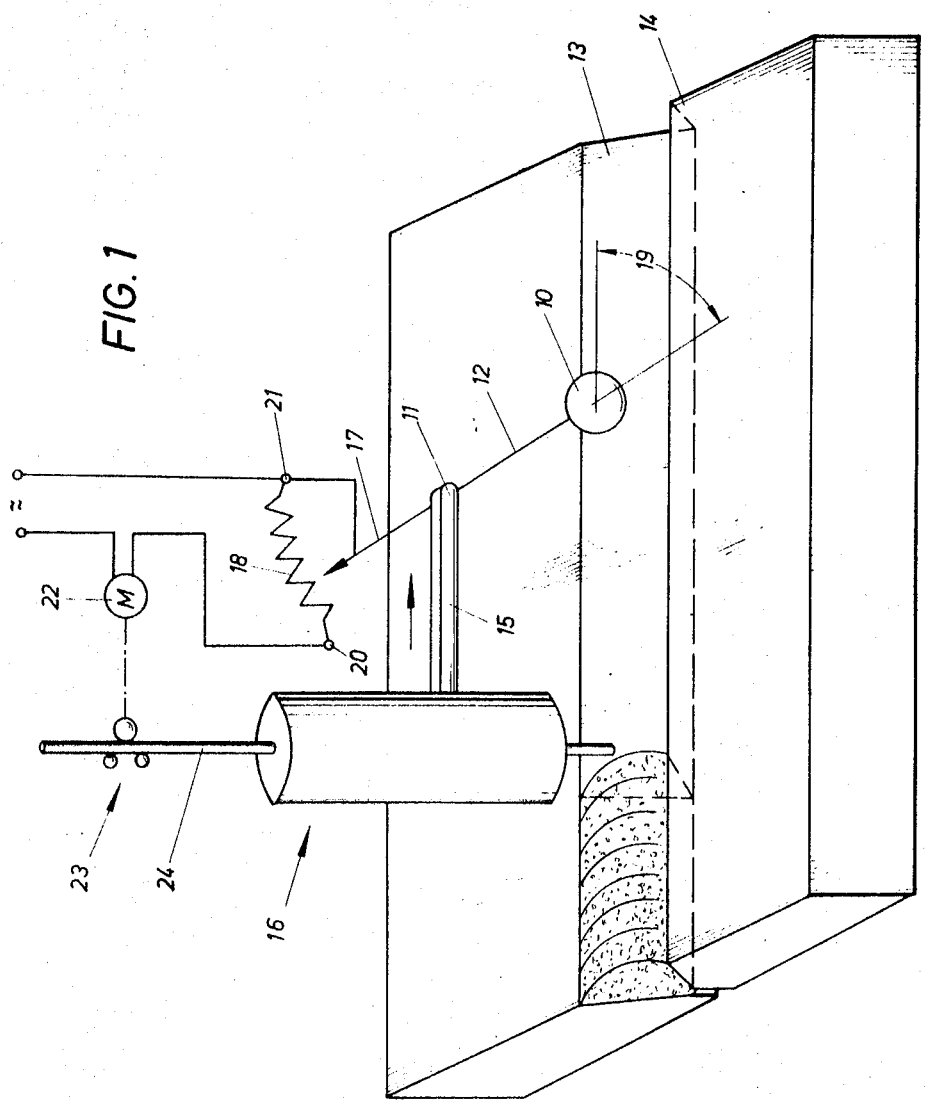
FIG. 1 is a perspective view of a scanning device operating with one roll.

According to FIG. 1, a scanning roll 10 is disposed at one end of a lever 12 pivoted at the point of rotation 11. The scanning roll 10 is in gear or contact with one (13) of the two edges 13, 14 of the welding groove. A holding device 15 carrying the lever 12 is rigidly fastened to the schematically shown welding torch 16. The lever can however be pivotally mounted on another place of the machine frame also. The free end 17 of lever 12 acts on a resistance 18 in such a manner that the changes in the angle—designated by 19—due to the changes in the welding groove produce changes in the voltage at the terminals 20, 21 of the resistance 18. Resistance 18 is connected in this embodiment directly with the circuit of a driving motor 22 for the rolls designated by 23 of a wire feed device. Depending on the change in voltage at the terminals 20, 21 the number of revolutions of the motor 22 changes, and the rate of feeding of the electrode rod 24 is increased or decreased. However, it is also possible to connect the resistance directly with the welding electric circuit or with the power circuit for the welding speed. For the sake of clarity none of these circuits is represented in this figure. Moreover, it is possible to replace the resistance 18 by a capacitive or inductive transmitter and to use this for varying the wire feed and/or the welding current and/or the welding voltage and/or the traveling velocity.

Figure 2:
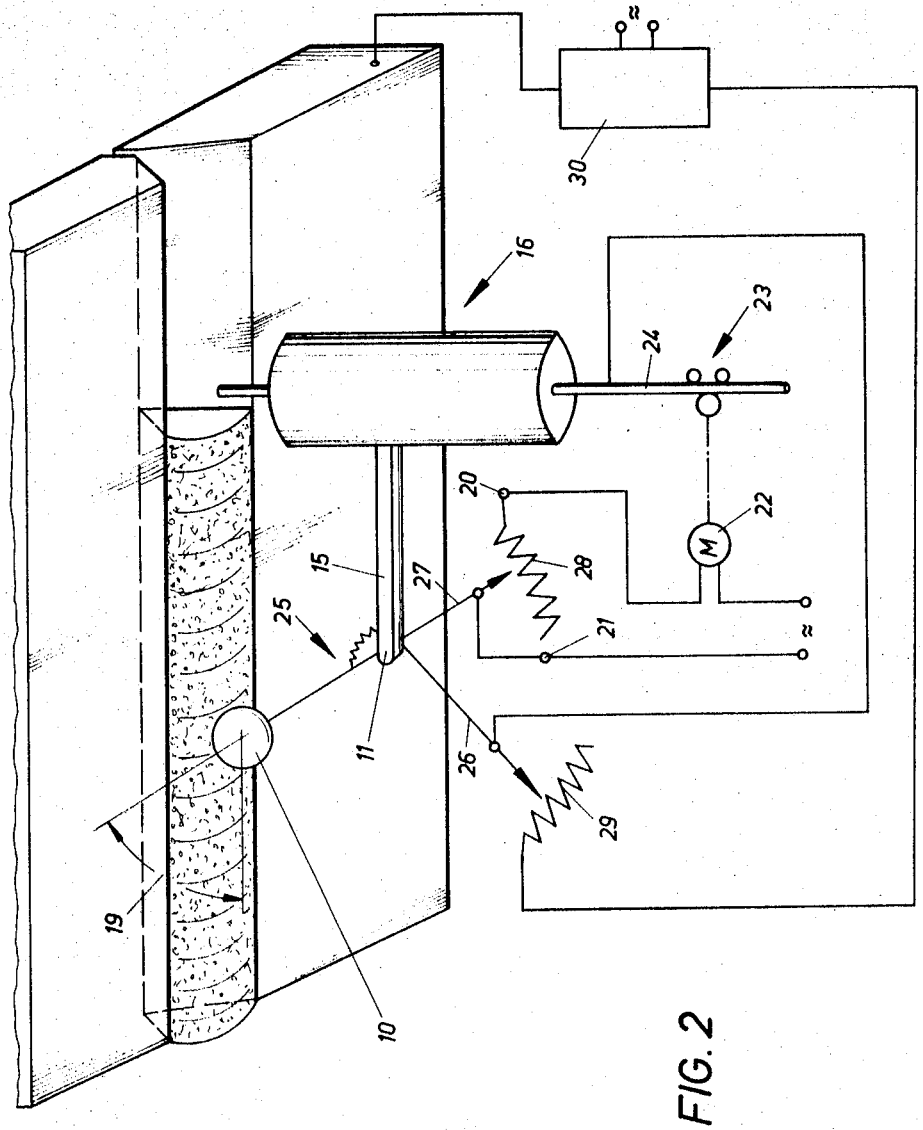
FIG. 2 shows an embodiment in which the scanning roll is guided on the welded seam in working in the overhead position.

FIG. 2 shows an embodiment of this invention in which the already introduced weld metal is scanned in an overhead welding. This model has a scanning roll 10, disposed on an angle lever (crank) 25. This lever 25 is pivoted on the holding device 15 which is rigidly jointed with the welding torch 16. The free end of the angle lever 25 is two-armed or forked. Both arms 26, 27 act, each on one resistance. The resistance 28 is connected in the above-described manner with the motor circuit of the driving motor 22 for the wire feeder. The second resistance 29 is on the other hand arranged in the circuit of the schematically illustrated welding current source designated by 30. The welding current source can be, for example, a CP-rectifier with transductor current regulation or a rectifier with an electromechanical current regulation. By changing the angle 19 because of a change in the desired weld reinforcement, both resistances 28, 29 are adjusted correspondingly so that the modified tapped voltage caused the weld metal application to change.

Figure 3:
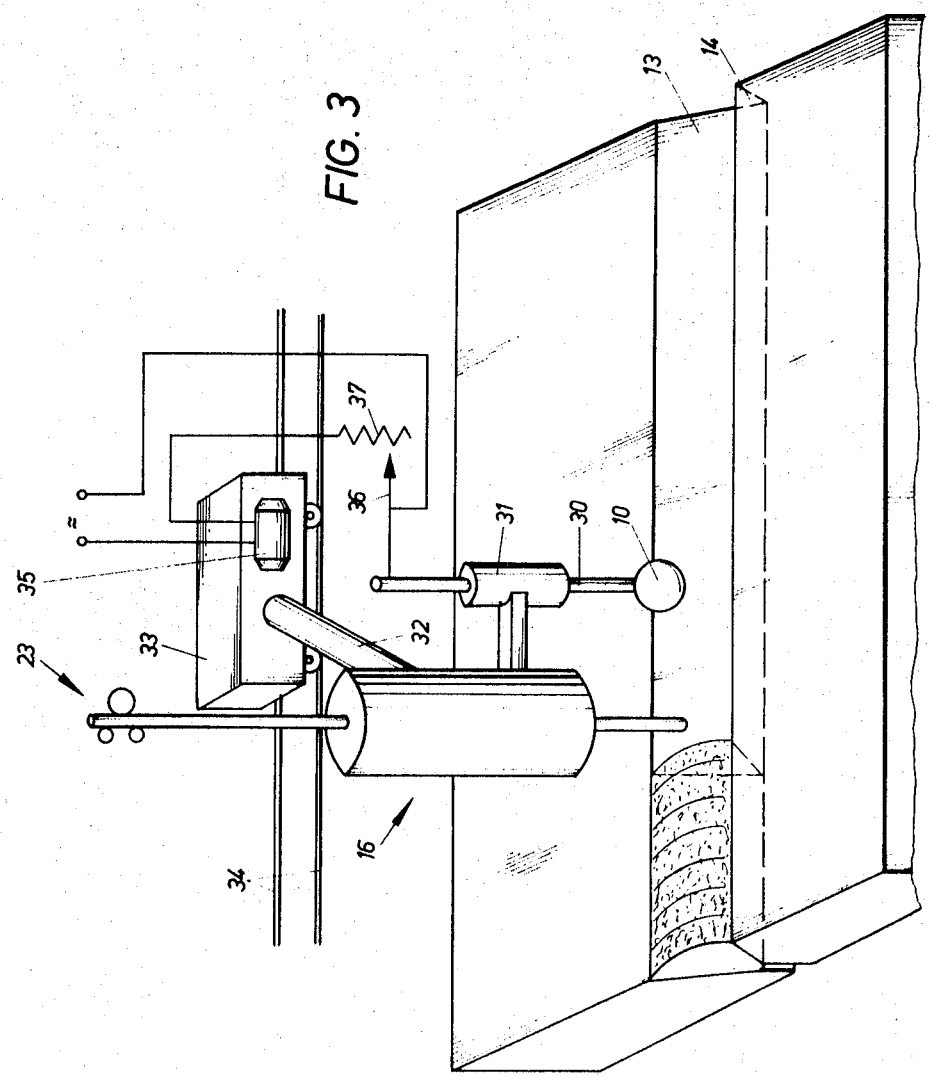
FIG. 3 shows another embodiment of a roll-type scanning, in a perspective view; also

In the embodiment of FIG. 3, the scanning roll 10 is arranged on a connecting rod 30 which is vertically movable in a guide 31 connected rigidly with the schematically illustrated welding torch designated by 16. The welding torch 16 is connected, for example, with a carriage 33 through arm 32. The carriage 33 moves on rails 34. The carriage 33 and hence the torch are driven by a driving motor 35. AT the free end of the connecting rod 30 a lever 36 is fastened which acts on a resistance 37 as the roll 10 and hence the connecting rod 30 change their height. The resistance 37 is connected with the current circuit of the driving motor 35, so that in case of a change in the voltage tapped at resistance 37, the number of revolutions of the motor 35 and hence the traveling velocity (feed) of the torch and the weld metal feed are influenced.

Figure 4:
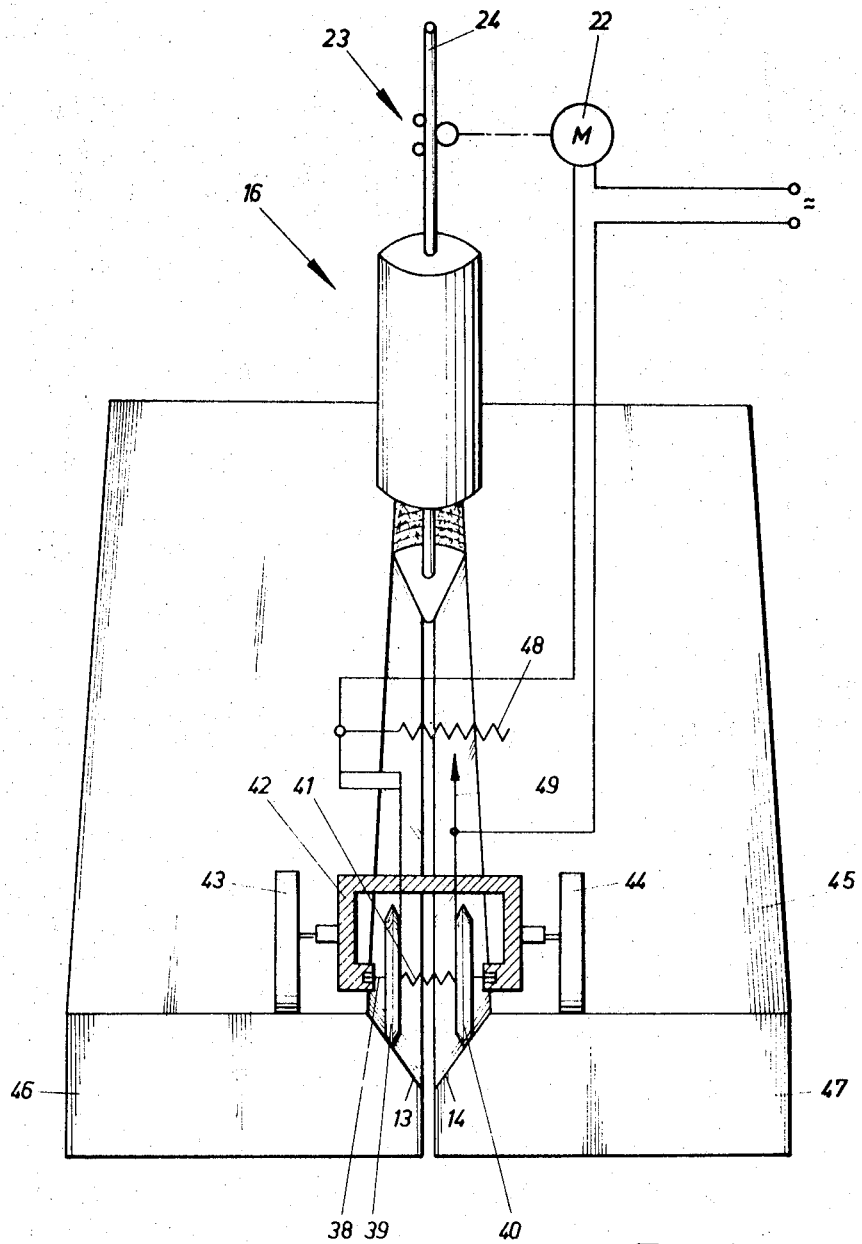
FIG. 4 illustrates a top view of scanning with two rolls.

In the embodiment shown in FIG. 4, two scanning rolls 39, 40 arranged on a common axis 28 at a certain distance from one another serve for scanning the edges 13, 14. By a pressure spring 41 disposed between the rolls 29, 30 these are pressed against the respective surface (13 or 14) of the welding groove. The axis 38 is carried by a frame 42, which in turn is located on a carriage movable on wheels 43, 44 on both edges of the welding joint. Thus the scanning rolls 39, 40 are held at the same level with respect to the surface 45 of the two workpieces 46, 47 to be welded.

Likewise, in the embodiment of FIG. 4, the changes in the width of the welding groove 13, 14 are used for adjustment. For this purpose, a resistance 48, formed in the above-described manner is fastened to roll or roller 39. The resistance is connected in this figure with the circuit of a driving motor 22 of a wire-feeding device, while a pointer 49 is connected with roll 40 to regulate the resistance 48. However, it is also possible to fasten the resistance 48 to one end of the pressure spring 41 and the pointer 49 to the other end of the pressure spring 41. If the width of the welding groove changes and hence the distance between the scanning rolls 39, 40, the resistance 48 will be adjusted and the weld metal feed is influenced.

Figure 5:
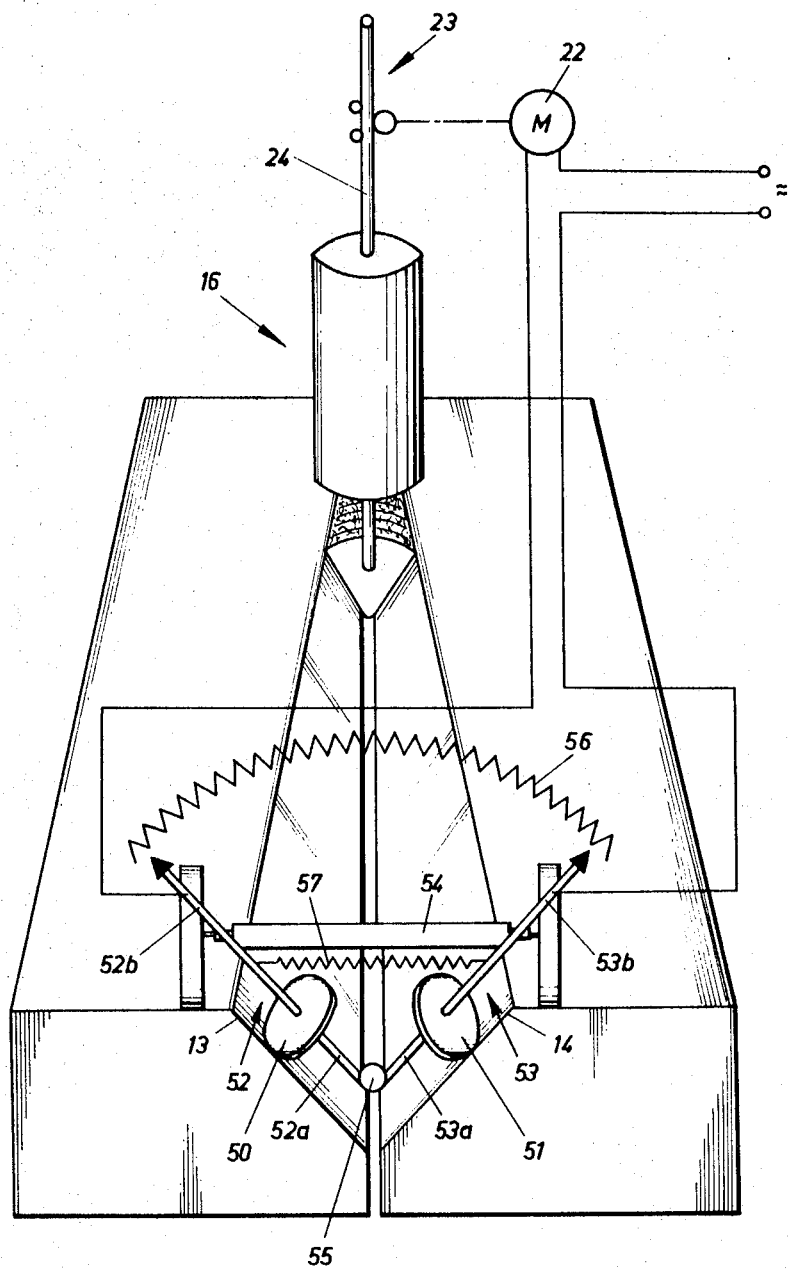
FIG. 5 illustrates a top view of a roll-type scanning with rolls arranged perpendicularly to the sides of a welding groove.

FIG. 5 shows another embodiment of the invention in which the scanning rolls 50 and 51, running always on one edge 13 or 14 of the welding groove are arranged on an axis or shaft 52 or 52. The lower ends 52a, 53a, of the axes 52, 53 are pivoted on a schematically illustrated carriage 54, and are hinged on a common point of rotation 55, while the free ends 52b, 53b act on the resistance 56 as pointers. A pressure spring 57 is arranged between the axes 52, 53, by which the scanning rolls 50, 51 are pressed to the edges 13, 14.

The resistance 56 is directly connected with a circuit of a wire-feeding device 22, 23, as shown in FIG. 1.

The construction of the scanning rolls shown in FIGS. 1-5 depends on the formation of the welding joint. The scanning rolls can have, for example, a flat, rounded, or wedge-shaped profile.

The devices shown in FIGS. 1, 3, 4 and 5 can also be used for scanning the already applied welding material. This invention aims especially at inserting a time-delay storage system between the scanning members and the followup control. The purpose of this storage system is the accurate control of the welding process depending on the scanned signal. Moreover, it is obvious that the scanning devices and the control circuits shown in FIGS. 1-5 are interchangeable. Thus, for example, it is possible to control the traveling velocity or the welding current feed with the scanning device according to FIG. 5.

It is also possible to use the models shown in FIGS. 1, 3, 4 and 5 for scanning a welding seam in the overhead position. The apparatus according to this invention can also be used for controlling the weld metal feed to vertical welding seams for example in welding containers.

What is claimed is:

1. An apparatus for controlling the application of weld metal in electric calarc welding with a consumable electrode welding torch, characterized in that a mechanical scanning device is arranged upstream from the consumable electrode welding torch, means for feeding the welding material to said torch, said scanning device penetrating into the welding groove to measure a physical dimension therein, and a converting device being attached to said scanning device to convert the measured values into signals for controlling the feed of the welding material.

2. A device according to claim 1, characterized in that the mechanical scanning device includes a pivoted lever, one end of said lever having a scanning sensor and the other end having a controlling sensor.

3. A device according to claim 2, characterized in that the converting device includes an adjustable resistance having a nonlinear character.

4. A device according to claim 3, characterized in that rolls are provided as the scanning sensors.

5. A device according to claim 2, characterized in that a capacitive tracer is provided as said scanning sensor.

6. A device according to claim 2, characterized in that an inductive tracer is provided as said scanning sensor.

7. A device according to claim 1, characterized in that the scanning device has two rolls which always run along opposite edges of the welding groove and the distance between them varies according to the change in the weld seam cross section with this change in distance giving a measured value for the signal of a change in the weld metal feed.

8. A device according to claim 2, characterized in that said scanning sensor has two rolls running always along the opposite edges of the welding groove, each of said rolls being mounted on a shaft, and both shafts being pivoted on a common point of rotation whereby a change in the angle of the shaft gives a measured value for the signal of the change in the weld metal feed.

9. A device according to claim 1, characterized in that a measuring device is attached to the welding torch for measuring the weld reinforcement and for converting the measured values into signals for correcting the welding parameters.

10. In a method of controlling the application of weld metal in electric calarc welding, the improvement comprising positioning a mechanical scanning device upstream from the welding torch, penetrating the scanning device into the welding groove to measure a physical dimension therein, converting the measured values from the scanning device into signals, and utilizing the signals to control the welding material feed into the torch.

PO-1050
(5/69)

UNITED STATES PATENT OFFICE
CERTIFICATE OF CORRECTION

Patent No. 3,612,818           Dated October 12, 1971

Inventor(s) Richard Bechtle et al

It is certified that error appears in the above-identified patent and that said Letters Patent are hereby corrected as shown below:

In the abstract, line 2, column 5, line 24 and column 6, line 28 "electric calarc"

should be --- electrical arc ---

Signed and sealed this 25th day of April 1972.

(SEAL)
Attest:

EDWARD M. FLETCHER, JR.          ROBERT GOTTSCHALK
Attesting Officer                   Commissioner of Patents